United States Patent
Baker et al.

(10) Patent No.: US 7,113,179 B2
(45) Date of Patent: Sep. 26, 2006

(54) FORCE SENSING RESISTOR WITH CALIBRATION ELEMENT AND METHOD OF MANUFACTURING SAME

(75) Inventors: Jeffrey R. Baker, Thousand Oaks, CA (US); Carlos S. Sanchez, Oxnard, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 261 days.

(21) Appl. No.: 10/874,624

(22) Filed: Jun. 23, 2004

(65) Prior Publication Data

US 2006/0007172 A1    Jan. 12, 2006

(51) Int. Cl.
G09G 5/00 (2006.01)
G06F 3/045 (2006.01)

(52) U.S. Cl. .................................. 345/178; 178/18.05

(58) Field of Classification Search ........ 345/156–159, 345/162, 173–179, 184; 178/18.01, 18.02, 178/18.03, 18.05, 18.07, 18.08, 20.03; 200/512; 340/407.2
See application file for complete search history.

(56) References Cited

U.S. PATENT DOCUMENTS

| | | | |
|---|---|---|---|
| 3,906,190 A * | 9/1975 | Light .......................... 708/830 |
| 4,213,005 A * | 7/1980 | Cameron ................. 178/18.07 |
| 4,235,141 A | 11/1980 | Eventoff |
| 4,268,815 A | 5/1981 | Eventoff |
| 4,276,538 A | 6/1981 | Eventoff et al. |
| 4,301,337 A | 11/1981 | Eventoff |
| 4,314,227 A | 2/1982 | Eventoff |
| 4,314,228 A | 2/1982 | Eventoff |
| 4,315,238 A | 2/1982 | Eventoff |
| 4,371,746 A * | 2/1983 | Pepper, Jr. .............. 178/18.05 |
| 4,435,616 A * | 3/1984 | Kley ....................... 178/18.05 |
| 4,451,714 A | 5/1984 | Eventoff |
| 4,456,787 A * | 6/1984 | Schlosser et al. ........ 178/18.05 |
| 4,489,302 A | 12/1984 | Eventoff |
| 4,575,581 A * | 3/1986 | Langberg ................. 178/18.02 |
| 4,622,437 A * | 11/1986 | Bloom et al. ............ 178/18.05 |
| 4,678,869 A * | 7/1987 | Kable ....................... 178/18.05 |
| 4,739,299 A | 4/1988 | Eventoff et al. |
| 4,810,992 A | 3/1989 | Eventoff |
| 4,963,702 A | 10/1990 | Yaniger et al. |
| 5,008,497 A * | 4/1991 | Asher ...................... 178/18.05 |
| 5,053,585 A | 10/1991 | Yaniger |
| 5,159,159 A * | 10/1992 | Asher ...................... 178/18.05 |
| 5,296,837 A | 3/1994 | Yaniger |
| 5,302,936 A | 4/1994 | Yaniger |
| 5,412,161 A * | 5/1995 | Crooks et al. ........... 178/18.02 |
| 5,515,040 A * | 5/1996 | Lee et al. .............. 340/870.04 |

(Continued)

*Primary Examiner*—Bipin Shalwala
*Assistant Examiner*—Jeff Piziali
(74) *Attorney, Agent, or Firm*—Brooks Kushman P.C.

(57) ABSTRACT

A force sensing resistor includes two substrates. Conductive traces including first, common, and calibration fingers are on the first substrate and define a contact area. A spacer surrounds the contact area and attaches the substrates together such that a cavity separates the substrates in the contact area. A first resistive layer is on the second substrate and arranged within the cavity. In response to a force moving one substrate, the first resistive layer electrically connects the first and common fingers with a resistance dependent upon resistivity of the first resistive layer and the applied force to produce an electrical signal indicative of the applied force. A second resistive layer is arranged within the cavity and electrically connects the calibration and common fingers with a resistance dependent upon resistivity of the second resistive layer to produce an electrical signal indicative of the resistivity of the second resistive layer.

27 Claims, 5 Drawing Sheets

U.S. PATENT DOCUMENTS

| | | | |
|---|---|---|---|
| 5,543,591 A * | 8/1996 | Gillespie et al. | 178/18.03 |
| 5,563,381 A * | 10/1996 | Crooks et al. | 178/18.03 |
| 5,659,334 A | 8/1997 | Yaniger et al. | |
| 5,790,102 A * | 8/1998 | Nassimi | 345/163 |
| 5,828,363 A | 10/1998 | Yaniger et al. | |
| 6,016,140 A * | 1/2000 | Blouin et al. | 345/178 |
| 6,370,961 B1 * | 4/2002 | Trantzas et al. | 73/824 |
| 6,587,097 B1 * | 7/2003 | Aufderheide et al. | 345/173 |
| 6,633,279 B1 * | 10/2003 | Kono et al. | 345/173 |
| 6,975,305 B1 * | 12/2005 | Yamashita | 345/173 |
| 6,999,009 B1 * | 2/2006 | Monney | 341/34 |
| 2002/0000979 A1 * | 1/2002 | Furuhashi et al. | 345/173 |
| 2002/0104369 A1 | 8/2002 | Baker et al. | |
| 2003/0076307 A1 * | 4/2003 | Krajewski et al. | 345/174 |

\* cited by examiner

FORCE SENSING RESISTOR WITH CALIBRATION ELEMENT AND METHOD OF MANUFACTURING SAME

BACKGROUND OF THE INVENTION

1. Field of the Invention

The present invention generally relates to force sensing resistors and, more particularly, to a force sensing resistor (FSR) having a calibration element and to a method of manufacturing such an FSR.

2. Background Art

Pressure sensitive transducers ("pressure transducers") generate a signal indicative of the amount of pressure applied to a flexible substrate. Pressure transducers may also generate a signal based on the location of pressure applied to the flexible substrate. Pressure transducers provide input for a wide variety of applications such as remote controls, game controllers, mouse pads, tactile sensors, and the like.

A construction for a pressure transducer includes one or more force sensing resistors (FSR). Various FSRs have been disclosed, such as those described in U.S. Pat. Nos. 4,314,227; 4,314,228; and 4,489,302. A typical FSR includes three parts: a (flexible or rigid) base, a spacer, and a flexible resistive substrate. Electrically conductive traces are arranged on the base typically in separated interdigitated sets. These traces may be configured in a single zone or in multiple zones to allow, for example, pointing devices as described in U.S. Pat. Nos. 5,659,334 and 5,828,363. The spacer spaces apart the flexible resistive substrate from the base. The spacer is typically a ring of material placed onto the base around the outer edge of the conductive traces. The spacer is also typically coated with an adhesive to connect the base to the flexible resistive substrate and hold the FSR together.

The flexible resistive substrate may be made of a polymer coated on its inner face with semi-conductive or resistive ink, giving force sensing properties to the FSR. U.S. Pat. Nos. 5,296,837 and 5,302,936 describe such FSR ink. FSR ink has a high humidity coefficient of resistance. When an FSR is used in changing humidity conditions, the high humidity resistance coefficient of the FSR ink limits the usefulness of the FSR to situations where only changes in force may be measured.

In pressure transducer applications, an FSR determines applied force. Such force, for example, may be the force applied by a finger to a button; the force applied to the barrel of a pen; the force applied in each direction of a four-direction pointing device; etc. In each application, the resistance of the FSR is measured and then converted to a force using a known relationship between force and resistance. This known relationship depends on the FSR geometry and on the mechanical characteristics of the actuator that contacts the FSR surface and is typically determined independently for each designed application.

A pressure transducer may include many FSRs arranged in a pattern or an array across the area of the pressure transducer. The location of an object touching the pressure transducer may be determined by which of the FSRs are activated in response to the touch. Typically, pressure transducers are manufactured in mass quantities over time. A problem is that manufacturing tolerances between the FSRs of pressure transducers manufactured over time may be +/−25%. These tolerance variances are caused by day-to-day and batch-to-batch FSR ink inconsistencies and by daily variations in manufacturing equipment setup. Thus, a need exists for an FSR that may be corrected for the effects caused by manufacturing variations and for the effects caused by temperature and humidity variations.

SUMMARY OF THE INVENTION

Accordingly, it is an object of the present invention to provide a force sensing resistor (FSR) having a calibration element which is operable to calibrate the FSR.

It is another object of the present invention to provide an FSR having a calibration element which corrects the FSR for effects caused by manufacturing variations.

It is a further object of the present invention to provide an FSR having a calibration element which corrects the FSR for effects caused by temperature variations.

It is still another object of the present invention to provide an FSR having a calibration element which corrects the FSR for effects caused by humidity variations.

It is still a further object of the present invention to provide a method of manufacturing an FSR having a calibration element which corrects the FSR for effects caused by manufacturing and environmental variations.

In carrying out the above objects and other objects, the present invention provides a force sensing resistor (FSR). The FSR includes first and second substrates each having inner surfaces. At least one of the substrates is flexible in order to move towards the other one of the substrates in response to an applied force. Electrically conductive traces are on the inner surface of the first substrate. The traces include a first finger, a common finger, and a calibration finger which together define a contact area on the inner surface of the first substrate. The first, common, and calibration fingers are electrically separated from one another.

A spacer substantially surrounds the contact area and attaches the substrates together such that a cavity separates the inner substrate surfaces in the contact area. A first resistive layer is on the inner surface of the second substrate such that the first resistive layer is arranged within the cavity. In response to a force applied to a flexible one of the substrates, the first resistive layer contacts and electrically connects the first and common fingers together with a resistance dependent upon resistivity of the first resistive layer and the applied force in order to produce an electrical signal indicative of the applied force.

A second resistive layer is arranged within the cavity such that the second resistive layer contacts and electrically connects the calibration and common fingers together with a resistance dependent upon resistivity of the second resistive layer in order to produce an electrical signal indicative of the resistivity of the second resistive layer.

The resistive layers preferably comprise the same resistive ink such that the signal indicative of the resistivity of the second resistive layer is indicative of the resistivity of the first resistive layer. The spacer preferably has a vent which allows air to be exchanged between the cavity and the environment outside of the cavity. The first and second substrates preferably comprise portions of the same flexible substrate sheet.

The calibration and common fingers may respectively be electrically connected to calibration and common lead traces. The calibration and common lead traces are electrically connected together at first and second times to measure the resistance of the second resistive layer at the two times. A change in the resistance of the second resistive layer between the two times is indicative of a change in the resistivity of the second resistive layer between the two times. An electrical signal indicative of a force applied to a flexible one of the substrates after the second time is then corrected as a function of the change in the resistivity of the second resistive layer between the two times.

The first and common fingers together define a first set of traces for a first zone of the contact area. The first resistive layer contacts and electrically connects the first and common fingers together in response to a force applied adjacent to the first contact area in order to produce an electrical signal indicative of the applied force. In this event, the traces may further include a second finger and a second common finger which are electrically separated from one another with the second common finger being electrically connected to the common finger. The second and second common fingers together define a second set of traces for a second zone of the contact area. The first resistive layer contacts and electrically connects the second and second common fingers together in response to a force applied to a flexible one of the substrates adjacent to the second contact area in order to produce an electrical signal indicative of the applied force.

The first and common fingers may be interdigitated, and the calibration and common fingers may be interdigitated. The fingers may include any number of sets of first fingers and common fingers arranged in zones such that a first set of first fingers and common fingers are in one zone and a second set of first fingers and common fingers are in another zone. The common trace for each zone may be interconnected or may be independent. The common trace for the calibration zone may be common with the other common traces or may be independent. There could even be multiple calibration zones.

Further, in carrying out the above objects and other objects, the present invention provides a method of forming an FSR. The method includes depositing electrically conductive traces on an inner surface of a first substrate. The traces include first, common, and calibration fingers which together define a contact area on the inner surface of the first substrate. The method further includes depositing a first resistive layer on an inner surface of a second substrate and depositing a second resistive layer on the inner surface of the first substrate such that the second resistive layer contacts and electrically connects the calibration and common fingers together with a resistance dependent upon resistivity of the second resistive layer in order to produce an electrical signal indicative of the resistivity of the second resistive layer.

The method further includes attaching an adhesive spacer to the inner surface of the first substrate such that the adhesive spacer substantially surrounds the contact area. The substrates are attached together using the adhesive spacer such that a cavity separates the inner surfaces of the substrates in the contact area with the resistive layers being arranged within the cavity such that, in response to a force applied to a flexible one of the substrates, the first resistive layer contacts and electrically connects the first and common fingers together with a resistance dependent upon resistivity of the first resistive layer and the applied force in order to produce an electrical signal indicative of the applied force.

The first and second resistive layers are preferably the same resistive ink. The spacer preferably has a vent to allow air to be exchanged between the cavity and the environment outside of the cavity.

The method may further include electrically connecting the calibration and common fingers together at a first time and at a subsequent second time to measure the resistance of the second resistive layer at the first and second times. A change in the resistance of the second resistive layer between the first and second times is indicative of a change in the resistivity of the second resistive layer between the first and second times. An electrical signal indicative of a force applied to one of a flexible one of the substrates after the second time is then corrected as a function of the change in the resistivity of the second resistive layer between the first and second times.

Also, in carrying out the above objects and other objects, the present invention provides a method of forming a plurality of FSRs at a given time. For each FSR, this method includes depositing electrically conductive traces on a bottom portion of a flexible substrate. The traces include first, common, and calibration fingers which together define a contact area. This method includes depositing, substantially at the same time, a first region of a resistive ink on a top portion of the substrate and a second region of the resistive ink on the common and calibration fingers on the bottom portion of the substrate. The second resistive ink region is deposited such that this region intimately and substantially permanently connects the common and calibration fingers with a resistance dependent upon resistivity of the resistive ink in order to produce an electrical signal indicative of the resistivity of the resistive ink.

This method includes attaching an adhesive spacer to one of the bottom and top substrate portions such that the adhesive spacer substantially surrounds the contact area when the bottom and top substrate portions are attached together. The bottom and top substrate portions are then attached together using the spacer such that a cavity separates the bottom and top substrate portions in the contact area with the first and second resistive ink regions being arranged within the cavity such that, in response to a force applied to a substrate, the first resistive ink region contacts and electrically connects the first and common fingers together with a resistance dependent upon the resistivity of the resistive ink and the applied force in order to produce an electrical signal indicative of the applied force.

Still further, in carrying out the above objects and other objects, the present invention provides another FSR. This FSR includes first and second substrates. At least one of the substrates is flexible in order to move in response to an applied force. Electrically conductive traces are on the first substrate. The traces include first, common, calibration fingers which together define a contact area on the first substrate. A spacer substantially surrounds the contact area and attaches the substrates together such that a cavity separates the substrates in the contact area. A first resistive layer is on the second substrate such that the first resistive layer is arranged within the cavity. In response to a force applied to a flexible one of the substrates, the first resistive layer contacts and electrically connects the first and the common fingers together with a resistance. A second resistive layer is arranged within the cavity such that the second resistive layer contacts and electrically connects the calibration and common fingers together with a resistance.

The above objects and other objects, features, and advantages of the present invention are readily apparent from the following detailed description when taken in connection with the accompanying drawings.

DETAILED DESCRIPTION OF THE PREFERRED EMBODIMENT(S)

Figure 1:
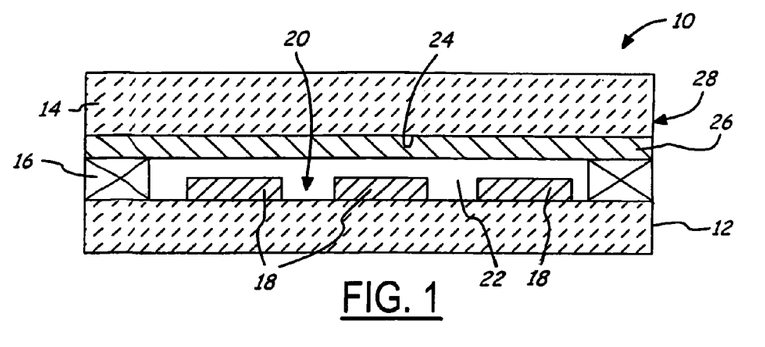
FIG. 1 illustrates a cross-sectional view of a pressure sensitive transducer having a force sensing resistor (FSR) in accordance with the present invention.

Referring now to FIG. 1, a cross-sectional view of a pressure sensitive transducer 10 having a force sensing resistor (FSR) in accordance with the present invention is shown. Pressure transducer 10 produces an electrical signal indicative of applied pressure. Pressure transducer 10 generally includes a first flexible substrate 12, a second flexible substrate 14, and a spacer 16. Flexible substrates 12 and 14 are individual portions obtained from the same flexible sheet of material such as, for example, Mylar. In response to one of substrates 12 and 14 being touched by an actuator or finger, this substrate deforms and moves toward the other one of the substrates. For example, second substrate 14 deforms and moves inward toward first substrate 12 in response to being touched.

Figure 2:
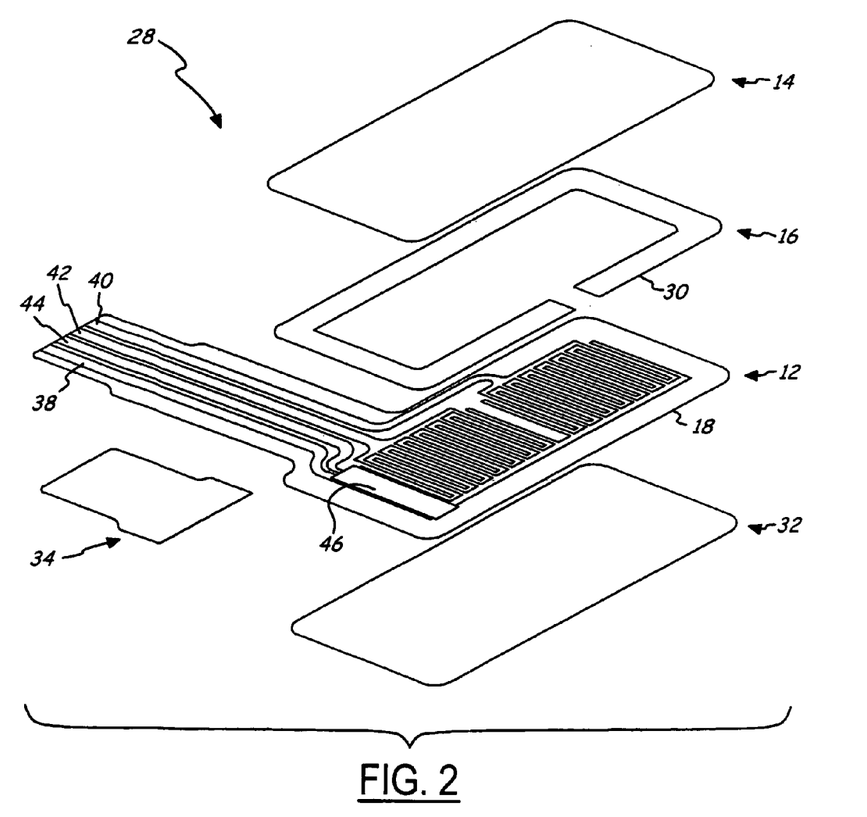
FIG. 2 illustrates an exploded view of the FSR in accordance with the present invention.

Electrically conductive traces 18 are formed on first substrate 12 to define contact area 20. Spacer 16 attaches first and second substrates 12 and 14 together in such a manner that the substrates are spaced apart from one another. Spacer 16 is an adhesive spacer layer which substantially surrounds contact area 20 thereby forming a gap or cavity 22 between substrates 12 and 14. Air typically fills cavity 22. As shown in FIG. 2, spacer 16 has a small air vent 30 on its perimeter so that air in cavity 22 may be exchanged between the inside and outside of the cavity.

Second substrate 14 has an inner surface 24 which faces contact area 20. A resistive layer 26 is deposited on inner surface 24. Resistive layer 26 moves inward towards first substrate 12 and contacts at least two traces 18 in response to pressure applied to second substrate 14 thereby producing a transducer electrical signal indicative of the applied pressure. That is, a force applied to second substrate 14 causes this substrate to deform towards first substrate 12. This causes resistive layer 26 to contact certain ones of traces 18 and short them together with an electrical resistance that depends upon the amount of applied force thereby producing the transducer electrical signal. Likewise, a force applied to first substrate 12 causes this substrate to deform towards second substrate 14. Again, this causes resistive layer 26 to contact certain ones of traces 18 and short them together with an electrical resistance that depends upon the amount of applied force thereby producing the transducer electrical signal.

Second substrate 14 with resistive layer 26, traces 18 on first substrate 12, and spacer 16 between the substrates together implement an FSR, shown generally by 28. FSR 28 as shown in FIG. 1 has first substrate 12 positioned beneath second substrate 14 such that traces 18 are positioned beneath resistive layer 26. Of course, FSR 28 will function the same if first substrate 12 is positioned above second substrate 14 such that traces 18 are positioned above resistive layer 26.

Traces 18 may be formed on first substrate 12 by any suitable means known in the art. For example, traces 18 may be formed by depositing conductive material onto first substrate 12 and then selectively removing a portion of the conductive material to define the traces. Traces 18 may also be formed by depositing conductive polymer thick film ink (usually by screen printing) on first substrate 12. Dimensions for traces 18 depend on the dimensions of FSR 28, material and construction for flexible substrates 12 and 14, material and construction for resistive layer 26, and the like.

Referring now to FIG. 2, with continuing reference to FIG. 1, an exploded view of FSR 28 is shown. As shown in FIG. 2, FSR 28 includes second flexible substrate (i.e., top substrate) 14, spacer layer 16, first flexible substrate (i.e., bottom substrate) 12, and traces 18 on the bottom substrate. FSR 28 further includes a rear adhesive layer 32 which adheres to the underside of bottom substrate 12. Not shown is an optional top environmental protection layer on top of top substrate 14. The top protection layer could be transparent and have printing on its inside surface. FSR 28 further includes a tail stiffener 34 for providing structural support to a connector portion of bottom substrate 12. Tail stiffener 34 may provide additional thickness for meeting the specifications for insertion into a specific connector.

Figure 3A:
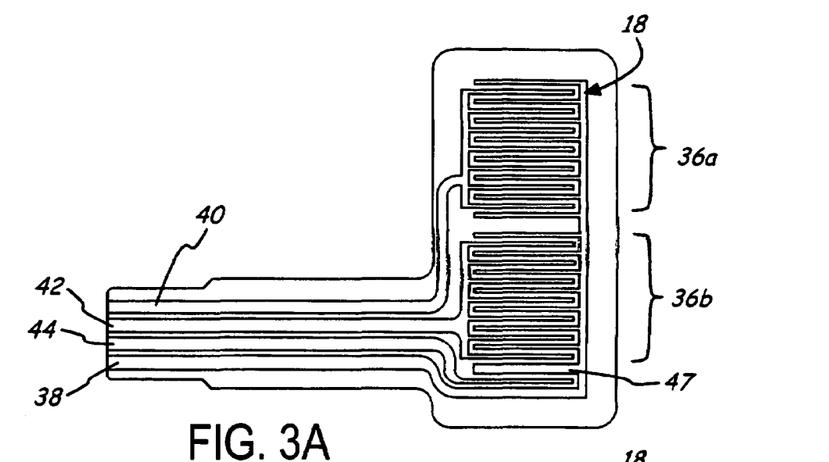
FIG. 3A illustrates a view of the bottom substrate of the FSR which shows the conductive traces including two sets of interdigitated trace fingers with each set having a respective lead trace, the common trace, and the calibration trace formed on the bottom substrate.
Figure 3B:
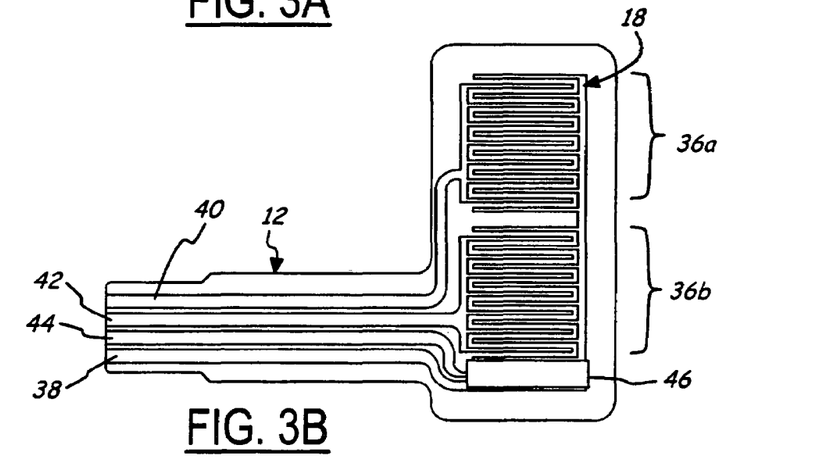
FIG. 3B illustrates a view of the bottom substrate of the FSR which shows the calibration resistor formed on the calibration trace and the common trace.
Figure 3C:
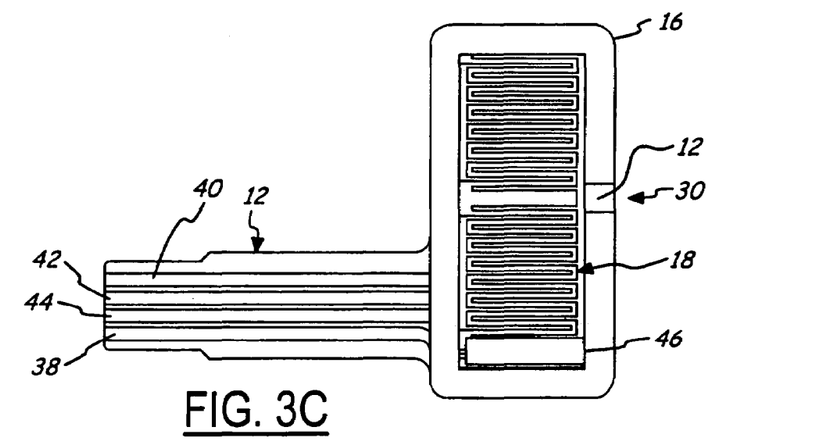
FIG. 3C illustrates a view of the bottom flexible substrate of the FSR which shows the adhesive spacer layer placed on the periphery of the bottom substrate and around the conductive trace zones.

Referring now to FIGS. 3A, 3B, and 3C, with continual reference to FIGS. 1 and 2, traces 18 are arranged in two zones within contact area 20. Multiple zones within contact area 20 permit many functions. One function is to locate the position of pressure on either substrate 12 or 14. Another function is to allow independent pressure measurement in two locations. Another function is to detect movement of a pressure contact spot from one zone to another zone.

The first zone is defined by a first set 36a of interdigitated trace fingers 18 and the second zone is defined by a second set 36b of interdigitated trace fingers. Each interdigitated trace finger set 36a, 36b shares a common trace 38. Each interdigitated trace finger set 36a, 36b has one lead trace: first interdigitated trace finger set 36a has lead trace 40; and second interdigitated trace finger set 36b has lead trace 42. Common trace 38 and lead traces 40, 42 are electrically separated and extend down the connector portion of bottom substrate 12. The connector portion of bottom substrate 12 is insertable into a connector.

In accordance with the present invention, traces 18 further include a calibration trace 44 and common trace 38 further includes a calibration common finger 47. (For clarity, calibration trace 44 is an electronically conductive trace having the identical characteristics as traces 18. Trace 44 is labeled "calibration trace" because it is for use with a calibration resistor as described below.) Calibration trace 44 and calibration common finger 47 are spaced apart from one another with a gap. Calibration trace 44 is electrically separated from common trace 38 and the sets of interdigitated trace finger sets 36a, 36b. Calibration trace 44 and calibration common finger 47 may be at one edge or slightly to the side of one of interdigtated trace sets 36a, 36b. Alternatively, calibration trace 44 and calibration common finger 47 may be located between or within sets of interdigitated trace sets 36a, 36b.

A patch of FSR ink is deposited across the gap between calibration trace 44 and calibration common finger 47. The patch of FSR ink lies on a finger portion of calibration trace 44 and calibration common finger 47 and forms a fixed resistor 46 (i.e., a calibration resistor 46). As calibration common finger 47 is part of common trace 38, the addition of calibration resistor 46 requires only one additional trace. This additional trace is calibration trace 44.

Spacer 16 is positioned on the periphery of bottom substrate 12 and around traces 18 and calibration resistor 46. As indicated above, spacer 16 connects bottom substrate 12 to top substrate 14 such that the two substrates are spaced apart from one another by cavity 22. Traces 18 and calibration resistor 46, which are both formed on bottom substrate 12, and resistive layer 26 formed on top substrate 14 share the same air within cavity 22. Air vent 30 on perimeter of spacer 16 allows air in cavity 22 to be exchanged between the inside and outside of FSR 28.

In accordance with the present invention, the FSR ink of the fixed resistor (i.e., calibration resistor 46) is deposited substantially at the same time and under the same conditions as the FSR ink (i.e., resistive layer 26) on top substrate 14. This is done in order to minimize the effect of manufacturing variations on the resistivity of calibration resistor 46 and resistive layer 26. As indicated above, bottom and top substrates 12, 14 are formed from the same flexible substrate sheet. Accordingly, calibration resistor 46 and resistive layer 26 are printed at the same time and on substrates formed from the same flexible substrate sheet.

Air vent 30 enables air to be exchanged into and out of cavity 22. As such, calibration resistor 46 and resistive layer 26 are impacted the same by temperature and humidity variations. After final assembly of FSR 28, calibration resistor 46 shares the same air space in air cavity 22 as resistive layer 26. This ensures that variations in ambient humidity and temperature equally affect both calibration resistor (i.e., the fixed resistor ink) 46 and resistive layer (i.e., the FSR ink) 26. Preferably, no part of calibration resistor 46 is covered or protected by spacer 16. However, part of calibration resistor 46 may be covered or protected by spacer 16 as long as that part of the calibration resistor is not electrically active. With this process and these constraints, the resistivity of the fixed resistor ink, and therefore the value of calibration resistor 46, varies proportionally to variations of the resistivity of the FSR ink caused by manufacturing tolerances, temperature changes, and humidity changes.

In FSR 28 with calibration resistor 46, the resistance provided by the calibration resistor and the resistance provided by resistive layer (i.e., FSR layer) 26 are measured. The resistance provided by calibration resistor 46 is measured when no force is being applied to either bottom or top substrates 12 and 14. Conversely, the resistance provided by FSR layer 26 is measured when force is applied to one of substrates 12 and 14, and, in response, the FSR layer contacts at least two traces 18 to form a complete electrical circuit between one of lead traces 40, 42 and common trace 38.

In practice, calibration resistor 46 can be measured every time FSR layer 26 is measured or it can be measured less frequently. For example, a host circuit may require FSR layer 26 (i.e., $R_{FSR}$) measurements so many times per second. If the host circuit is in a thermally stable office environment, the ambient humidity and therefore the value of calibration resistor 46 could be expected to remain fairly constant over short time scales. It might therefore only be necessary to measure the resistance of calibration resistor 46 (i.e., $R_{CAL}$ every hour or so or even just once at power-up. If, on the other hand, FSR 28 is part of a portable device, the ambient humidity and therefore the resistivity of calibration resistor 46 could change rapidly if the portable device were carried from an air conditioned room into the humid outdoors. In this case, it would be prudent to measure calibration resistor 46 at a faster rate such as once per minute.

Figure 4:
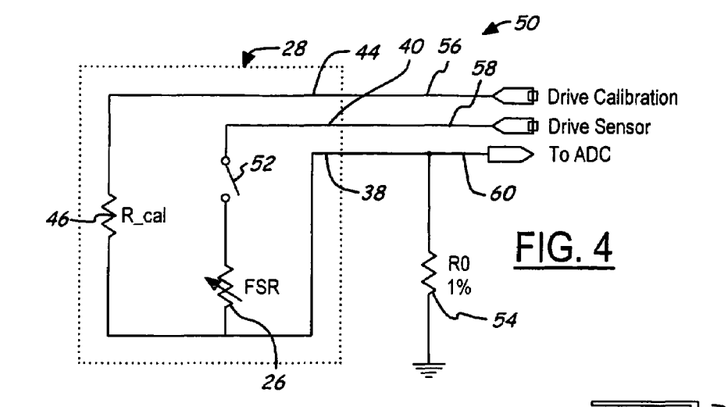
FIG. 4 illustrates a schematic representation of the FSR with the calibration resistor and a possible interface circuit in accordance with the present invention.

Referring now to FIG. 4, a schematic representation 50 of FSR 28 and a possible interface circuit in accordance with the present invention is shown. FSR 28 is contained within the dashed lines of schematic representation 50. The force sensitive aspect (i.e., FSR layer 26) of FSR 28 in one contact area zone is represented by a variable resistor $R_{FSR}$, with a switch 52 to indicate the force threshold required to bring inner faces of bottom and top substrates 12, 14 into contact. Calibration resistor 46 is represented by a fixed resistor $R_{CAL}$. External to FSR 28 are a known resistor ($R_O$) 54 and three electrical connections 56, 58, 60 to a host circuit (not shown). For the represented contact area zone, drive line 56 is connected to calibration trace 44; drive line 58 is connected to one of lead traces 40, 42 (assume first contact area zone so drive line 58 is connected to lead trace 40); and ADC (analog-to-digital converter) line 60 is connected to common trace 38.

In order to use the calibration feature of FSR 28, a nominal value for $R_{CAL}$ is first chosen. This could be an arbitrary value chosen to simplify subsequent calculations (for example, 1 k-ohm) or it could be the average $R_{CAL}$ measured during manufacturing (for example, 2.2351 k-ohm). Each measurement of $R_{CAL}$ is used to determine a correction factor k, such that k is the ratio of the nominally chosen value to a currently measured value. For example, if the nominal value of $R_{CAL}$ is chosen to be 1 k-ohm and a current measurement finds that $R_{CAL}$=1.1 k-ohm, then k is approximately 0.91. Subsequent measurements of $R_{FSR}$ are then multiplied by the factor of k in order to scale them to appear as if they were measured from a nominal FSR.

As suggested by schematic representation 50, a host circuit such as a microprocessor with an analog to digital converter (ADC) is one way to measure the resistance of calibration resistor 46 ($R_{CAL}$) and the resistance of FSR layer 26 ($R_{FSR}$). Again, the host circuit represents a possible way to interface FSR 28 with two drive lines 56, 58 and one ADC line 60 being connected to pins of the host circuit. The host circuit is capable of measuring the resistance of both calibration resistor 46 ($R_{CAL}$) and FSR layer 26 ($R_{FSR}$). Together with either calibration resistor 46 or FSR layer 26, an external resistor ($R_O$) 54 having a known resistor value sets up a voltage divider circuit.

To measure calibration resistor 46 ($R_{CAL}$), a voltage is applied to calibration drive line 56 while FSR drive line 58 is disconnected. The voltage on ADC line 60 is then given by the equation $V_{ADC}=V_{DRIVE}*(R_{CAL}+R_O)/R_{CAL}$, which can easily be solved for $R_{CAL}$. Similarly, $R_{FSR}$ can be found by applying a voltage to FSR drive line 58 while calibration drive line 56 is disconnected. In general, there are many possible techniques for measuring $R_{CAL}$ and $R_{FSR}$.

During measurement, calibration resistor 46 may be partially shorted if top substrate 14 containing FSR layer 26 is pressed against it during use. In this case, the value of calibration resistor 46 is unpredictable. To avoid this problem, calibration resistor 46 is measured when FSR 28 is not actuated. Another way to avoid this problem is to arrange the size, shape, and location of FSR layer 26 so that it would not lie across calibration resistor 46, and could therefore not be pressed against the calibration resistor.

Bottom substrate 12 may be expanded to include space for accepting electronic elements for measuring the output of FSR sensor 28. Such electronic elements may be the host circuit (i.e., the utilization circuit). This technique eliminates the inconvenience of requiring a separate attachment of the sensor leads to the utilization circuit, thereby increasing reliability and lowering overall system cost.

In accordance with the present invention, many FSRs 28 are manufactured simultaneously on the same flexible substrate sheet. The method for manufacturing FSRs 28, in accordance with the present invention, generally includes the following steps for each FSR 28 being manufactured. First, conductive traces 18 for each FSR 28 are deposited on a bottom half of the flexible substrate sheet such as bottom substrate 12. Second, FSR ink for calibration resistor 46 is deposited over traces 18 at the calibration regions of each FSR 28. Third, FSR ink for resistive layer 26 is deposited on a top half of the flexible substrate sheet such as top substrate 14. Fourth, the bottom and top substrates 12 and 14 are adhered together using an adhesive spacer 16. Fifth, FSRs 28 are singulated by die cutting.

Figure 5A:
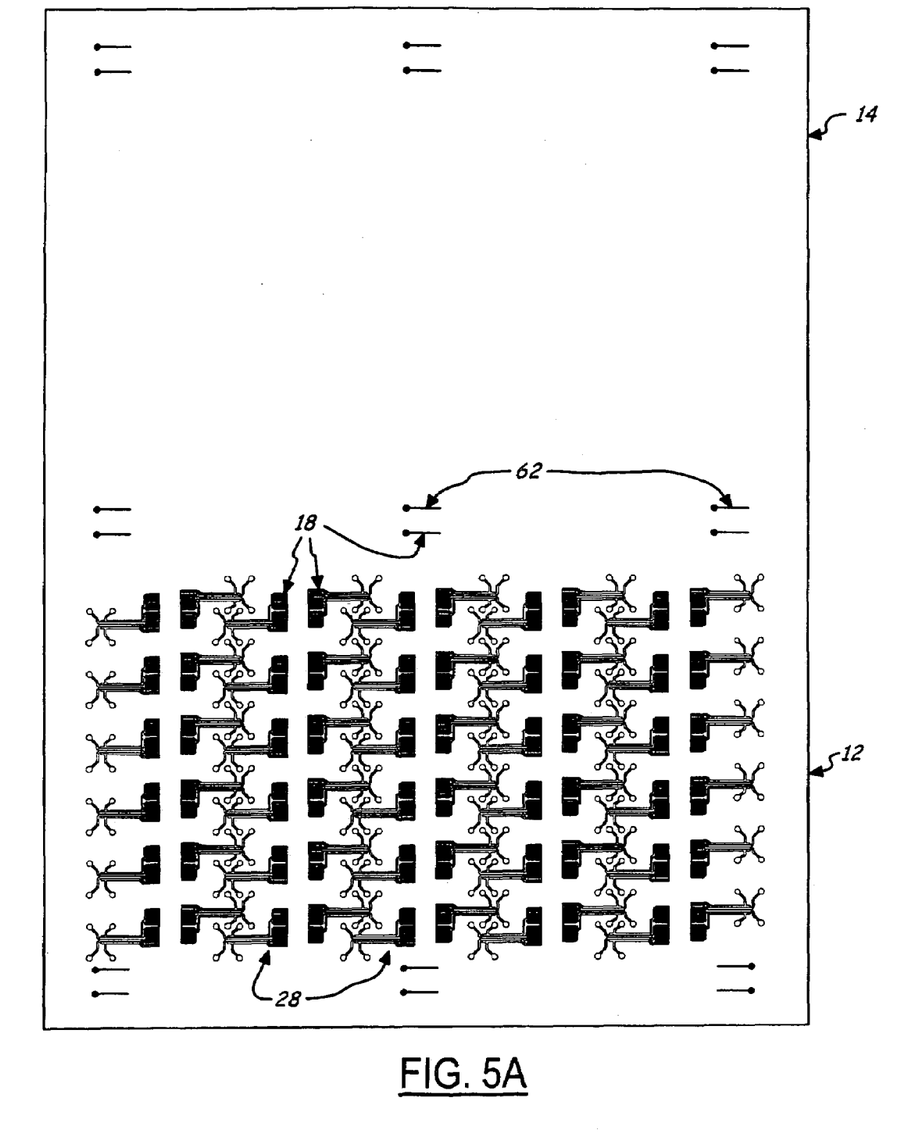
FIG. 5A illustrates the bottom and top halves of a substrate sheet (the halves will become the bottoms and tops of individual FSRs) after deposition of conductive traces on the bottom substrate half and prior to deposition of FSR ink.
Figure 5B:
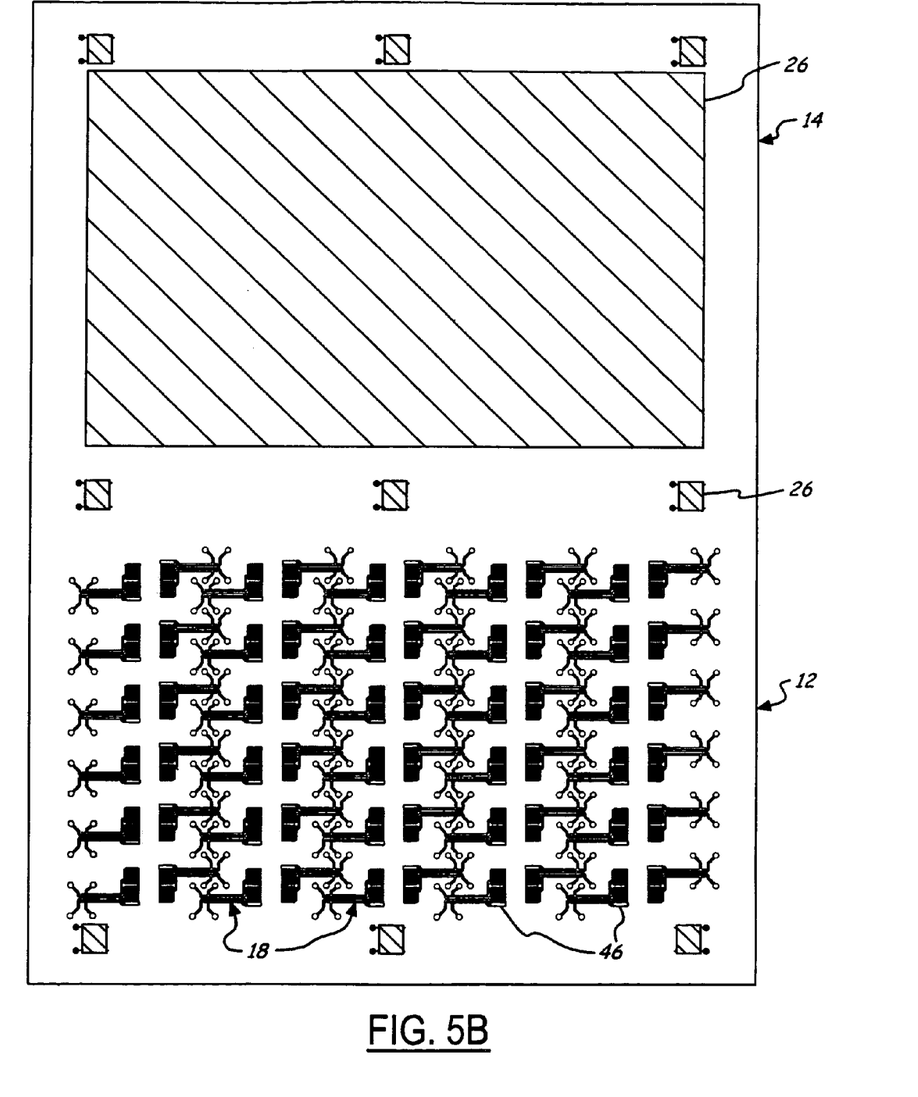
FIG. 5B illustrates the bottom and top halves of the substrate sheet after deposition of the FSR ink on the conductive traces and after deposition of the FSR ink on the top substrate half.

One goal of the manufacturing method in accordance with the present invention is to print the FSR ink of calibration resistor 46 and resistive layer 26 as evenly as possible, so that manufacturing variations in one are reflected in the other. This is achieved by arranging FSR sensors 28 on the bottom half of the flexible substrate sheet as shown in FIGS. 5A and 5B. As shown in FIGS. 5A and 5B, the flexible substrate sheet is divided up into two halves: bottom substrate half 12 and top substrate half 14.

If uniform FSR ink printing is not possible, another method for guaranteeing that manufacturing variations in one are reflected in the other is to ensure that variations in the flexible substrate sheet are symmetrical. If for example the left side of the flexible substrate sheet is unavoidably different from the right side of the flexible substrate sheet, it will not matter as long as resistive layers 26 from the left side are assembled with traces 18 and calibration resistors 46 from the left side to form FSRs 28. Likewise, resistive layers 26 from the right side are assembled with traces 18 and calibration resistors 46 from the right side to form FSRs 28.

As shown in FIG. 5A, conductive traces 18 are deposited on bottom substrate half 12. Bottom substrate half 12 will eventually become the bottom substrates 12 of individual FSR sensors 28. FIG. 5A also illustrates top substrate half 14 prior to deposition of FSR layer 26. Top substrate half 14 will eventually become the top substrates 14 of individual FSR sensors 28.

After deposition of traces 18, the calibration regions on bottom substrate half 12 for FSR sensors 28 are printed with FSR ink at the same time top substrate half 14 is printed with FSR ink to form resistive layer 26 for the FSR sensors as shown in FIG. 5B. FIG. 5B illustrates the bottom and top substrate halves 12, 14 after deposition of the FSR ink (i.e., calibration resistor 46) on traces 18 in each FSR sensor's 28 calibration resistor zone and after deposition of the FSR ink (i.e., resistive layer 26) on top substrate half 14. To complete the assemblies of the individual FSR sensors 28 using this technique, the flexible substrate sheet is then cut in half such that bottom substrate half 12 is treated as bottom substrate 12 and top substrate half 14 is treated as top substrate 14 for each individual FSR sensor 28. Top substrate half 14 is then adhered to bottom substrate half 12 using adhesive spacer layer 16. The entire assembly is then cut into individual FSR sensors 28. Not shown in either of FIGS. 5A and 5B are crop marks and alignment holes which are used to align layers to each other during assembly.

Spacer 16 is typically an adhesive sheet material such as 9762 from 3M Corporation. The adhesive spacer sheet is typically cut to be the size of the bottom and top substrate halves 12, 14 and contain holes such that when adhered to one of the substrate halves the holes reveal all but the perimeter of each individual FSR sensor 28. The adhesive spacer sheet adheres the bottom and top substrate halves 12, 14 together.

As shown in FIGS. 5A and 5B, there are nine regions 62 where conductive traces 18 are printed, and where FSR ink 26 will be deposited, for the purpose of judging deposition uniformity.

Figures 6A, 6B:
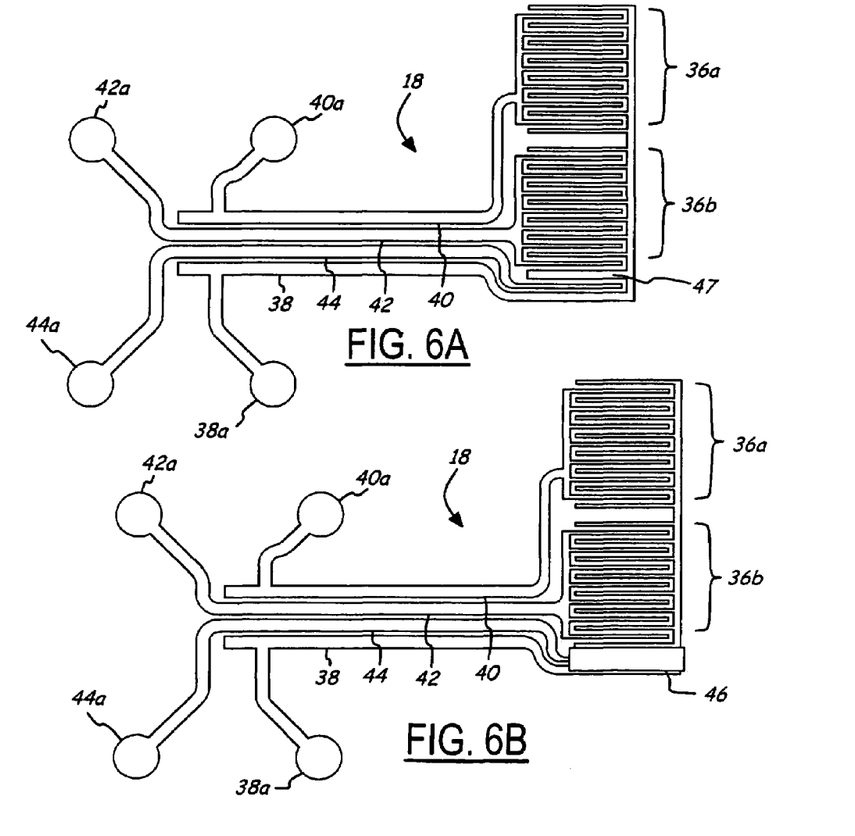
FIG. 6A illustrates the conductive traces deposited on the bottom substrate half for one FSR shown in FIG. 5A.
FIG. 6B illustrates the conductive traces and the calibration resistor on the bottom substrate half for one FSR shown in FIG. 5B.

FIG. 6A illustrates the arrangement of traces 18 deposited on bottom substrate half 12 for one FSR sensor 28. Traces 18 are arranged to provide two zones of contact areas. The first contact area zone is provided by first set 36a of trace fingers 18; and the second contact area zone is provided by second set 36b of trace fingers 18. FIG. 6B illustrates calibration resistor 46 deposited over traces 18 in the calibration region zone for one FSR sensor 28. Common trace 38, lead traces 40 and 42, and calibration trace 44 have respective associated circular trace pads 38a, 40a and 42a, and 44a. Trace pads 38a, 40a, 42a, and 44a allow checking of the resistance of calibration resistor 46 and checking of the two zones for completed circuits caused by resistive layer 26 shorting two traces 18 together.

Other arrangements of FSR patches and calibration resistor patches which allow them to be deposited simultaneously on the flexible substrate sheet are possible. For example, an FSR patch could be printed adjacent to each FSR sensor 28. The close proximity of the FSR and calibration resistor patches wold provide even more similarity between the two. However, completing assembly of each FSR sensor 28 would be more labor intensive.

Thus, it is apparent that there has been provided, in accordance with the present invention, a force sensing resistor having a calibration element and a method of manufacturing same that fully satisfy the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A force sensing resistor comprising:
   first and second substrates each having inner surfaces, wherein at least one of the substrates is flexible in order to move towards the other one of the substrates in response to an applied force;
   a plurality of electrically conductive traces on the inner surface of the first substrate, the traces including a first finger, a common finger, and a calibration finger which together define a contact area on the inner surface of the first substrate;
   wherein the first finger, the common finger, and the calibration finger are electrically separated from one another;
   a spacer substantially surrounding the contact area and attaching the substrates together such that a cavity separates the inner surfaces of the substrates in the contact area;

a first resistive layer on the inner surface of the second substrate such that the first resistive layer is arranged within the cavity, wherein the common finger and the calibration finger are physically distinct from the first finger and the first resistive layer;

wherein, in response to a force applied to a flexible substrates, the first resistive layer contacts and electrically connects the first finger and the common finger together with a resistance dependent upon resistivity of the first resistive layer and the applied force in order to produce an electrical signal indicative of the applied force; and a second resistive layer arranged within the cavity such that the second resistive layer contacts and electrically connects the calibration finger and the common finger together with a resistance dependent upon resistivity of the second resistive layer in order to produce an electrical signal indicative of the resistivity of the second resistive layer.

2. The force sensing resistor of claim 1 wherein:
the first and second resistive layers comprise the same resistive ink such that the electrical signal indicative of the resistivity of the second resistive layer is indicative of the resistivity of the first resistive layer.

3. The force sensing resistor of claim 2 wherein:
the calibration finger and the common finger are respectively electrically connected to a calibration lead trace and a common lead trace;
wherein the calibration lead trace and the common lead trace are electrically connected together at a first time and at a subsequent second time to measure the resistance of the second resistive layer at the first and second times, wherein a change in the resistance of the second resistive layer between the first and second times is indicative of a change in the resistivity of the second resistive layer between the first and second times;
wherein an electrical signal indicative of a force applied to one of a flexible one of the substrates after the second time is corrected as a function of the change in the resistivity of the second resistive layer between the first and second times.

4. The force sensing resistor of claim 1 wherein:
the first and second resistive layers are exposed to the same environment.

5. The force sensing resistor of claim 1 wherein:
the first and second substrates comprise respective portions of the same flexible substrate sheet.

6. The force sensing resistor of claim 1 wherein:
the spacer has a vent which allows air to be exchanged between the cavity and the environment outside of the cavity.

7. The force sensing resistor of claim 1 wherein:
the first finger and the common finger together define a first zone of the contact area, wherein the first resistive layer contacts and electrically connects the first finger and the common finger together in response to a force applied adjacent to the first contact area in order to produce an electrical signal indicative of the applied force.

8. The force sensing resistor of claim 1 wherein:
the plurality of traces on the inner surface of the first substrate include sets of first fingers and common fingers, wherein the first finger and the common finger in each set of traces are electrically separated from one another, wherein the first finger and the common finger in each set of traces define a respective zone of the contact area;
wherein the first resistive layer contacts and electrically connects the first finger and the common finger of a set of traces together in response to a force applied to a flexible one of the substrates adjacent to the contact area zone corresponding to the set of traces in order to produce an electrical signal indicative of the applied force.

9. The force sensing resistor of claim 1 wherein:
the first finger and the common finger are interdigitated.

10. The force sensing resistor of claim 9 wherein:
the calibration finger and the common finger are interdigitated.

11. A method of forming a force sensing resistor, the method comprising:
depositing a plurality of electrically conductive traces on an inner surface of a first substrate, the traces including a first finger, a common finger, and a calibration finger which together define a contact area on the inner surface of the first substrate, wherein the first finger, the common finger, and the calibration finger are electrically separated from one another;
depositing a first resistive layer on an inner surface of a second substrate, wherein at least one of the first and second substrates are flexible, and wherein the common finger and the calibration finger are physically distinct from the first finger and the resister layer;
depositing a second resistive layer on the inner surface of the first substrate such that the second resistive layer contacts and electrically connects the calibration finger and the common finger together with a resistance dependent upon resistivity of the second resistive layer in order to produce an electrical signal indicative of the resistivity of the second resistive layer;
attaching an adhesive spacer to the inner surface of one of the substrates such that the adhesive spacer substantially surrounds the contact area; and
attaching the first and second substrates together using the adhesive spacer such that a cavity separates the inner surfaces of the first and second substrates in the contact area with the first and second resistive layers being arranged within the cavity such that, in response to a force applied to a flexible one of the substrates, the first resistive layer contacts and electrically connects the first finger and the common finger together with a resistance dependent upon resistivity of the first resistive layer and the applied force in order to produce an electrical signal indicative of the applied force.

12. The method of claim 11 wherein:
depositing the first resistive layer includes depositing a resistive ink on the inner surface of the second substrate; and
depositing the second resistive layer includes depositing the resistive ink on the inner surface of the first substrate.

13. The method of claim 12 further comprising:
electrically connecting the calibration finger and the common finger together at a first time and at a subsequent second time to measure the resistance of the second resistive layer at the first and second times, wherein a change in the resistance of the second resistive layer between the first and second times is indicative of a change in the resistivity of the second resistive layer between the first and second times; and
correcting an electrical signal indicative of a force applied to one of a flexible one of the substrates after the second time as a function of the change in the resistivity of the second resistive layer between the first and second times.

14. The method of claim 11 wherein:
providing a vent in the spacer to allow air to be exchanged between the cavity and the environment outside of the cavity.

15. The method of claim 11 further comprising:
defining a first zone of the contact area with the first finger and the common finger, wherein the first resistive layer contacts and electrically connects the first finger and the common finger together in response to a force applied adjacent to the first contact area in order to produce an electrical signal indicative of the applied force.

16. The method of claim 11 wherein:
depositing the traces on the inner surface of the first substrate includes depositing the traces such that the first finger and the common finger are interdigitated.

17. The method of claim 16 wherein:
depositing the traces on the inner surface of the first substrate includes depositing the traces such that the calibration finger and the common finger are interdigitated.

18. A method of forming a plurality of force sensing resistors at a given time, for each force sensing resistor the method comprising:
depositing a plurality of electrically conductive traces on a bottom portion of a flexible substrate, the traces including a first finger, a common finger, and a calibration finger which together define a contact area and which are electrically separated from one another;
depositing a first region of a resistive ink on a top portion of the substrate; wherein the common finger and the calibration finger are physically distinct from the first finger and the first region of the resistive ink;
substantially at the same time as depositing the first region, depositing a second region of the resistive ink on the common finger and the calibration finger such that the second resistive ink region intimately and substantially permanently connects the common finger and the calibration finger with a resistance dependent upon resistivity of the resistive ink in order to produce an electrical signal indicative of the resistivity of the resistive ink;
attaching an adhesive spacer to one of the bottom and top portions of the substrate such that the adhesive spacer substantially surrounds the contact area when the bottom and top portions of the substrate are attached together; and
attaching the bottom and top portions of the substrate together using the adhesive spacer such that a cavity separates the bottom and top portions of the substrate in the contact area with the first and second resistive ink regions being arranged within the cavity such that, in response to a force applied to a substrate, the first resistive ink region contacts and electrically connects the first finger and the common finger together with a resistance dependent upon the resistivity of the resistive ink and the applied force in order to produce an electrical signal indicative of the applied force.

19. The method of claim 18 further comprising:
electrically connecting the calibration finger and the common finger together at a first time and at a subsequent second time to measure the resistance of the second resistive ink region at the first and second times, wherein a change in the resistance of the second resistive ink region between the first and second times is indicative of a change in the resistivity of the second resistive ink region between the first and second times; and
correcting an electrical signal indicative of a force applied a substrate after the second time as a function of the change in the resistivity of the second resistive ink region between the first and second times.

20. The method of claim 18 further comprising:
providing a vent in the spacer to allow air to be exchanged between the cavity and the environment outside of the cavity.

21. A force sensing resistor comprising:
first and second substrates, wherein at least one of the substrates is flexible in order to move in response to an applied force;
a plurality of electrically conductive traces on the first substrate, the traces including a first finger, a common finger, and a calibration finger which together define a contact area on the first substrate, wherein the first finger, the common finger, and the calibration finger are electrically separated from one another;
a spacer substantially surrounding the contact area and attaching the substrates together such that a cavity separates the substrates in the contact area;
a first resistive layer on the second substrate such that the first resistive layer is arranged within the cavity, wherein the common finger and the calibration finger are physically distinct from the first finger and the first resistive layer;
wherein, in response to a force applied to a flexible one of the substrates, the first resistive layer contacts and electrically connects the first finger and the common finger together with a resistance; and
a second resistive layer arranged within the cavity such that the second resistive layer contacts and electrically connects the calibration finger and the common finger together with a resistance.

22. The force sensing resistor of claim 21 wherein:
the first and second resistive layers comprise the same resistive ink.

23. The force sensing resistor of claim 21 wherein:
the calibration finger and the common finger are electrically connected at a first time and at a subsequent second time to measure the resistance of the second resistive layer at the first and second times, wherein a change in the resistance of the second resistive layer between the first and second times is indicative of a change in the resistivity of the second resistive layer between the first and second times;
wherein an electrical signal indicative of a force applied to one of a flexible one of the substrates after the second time is corrected as a function of the change in the resistivity of the second resistive layer between the first and second times.

24. The force sensing resistor of claim 21 wherein:
the spacer has a vent which allows air to be exchanged between the cavity and the environment outside of the cavity.

25. The force sensing resistor of claim 21 wherein:
the first finger and the common finger are interdigitated.

26. The force sensing resistor of claim 25 wherein:
the calibration finger and the common finger are interdigitated.

27. The force sensing resistor of claim 21 wherein:
the first and second substrates comprise respective portions of the same flexible substrate sheet.

* * * * *

UNITED STATES PATENT AND TRADEMARK OFFICE
CERTIFICATE OF CORRECTION

PATENT NO.        : 7,113,179 B2                                                Page 1 of 1
APPLICATION NO.   : 10/874624
DATED             : September 26, 2006
INVENTOR(S)       : Jeffrey R. Baker et al.

It is certified that error appears in the above-identified patent and that said Letters Patent is hereby corrected as shown below:

Column 11, Line 6, Claim 1:

After "flexible" insert -- one of the --.

Column 12, Line 27, Claim 11:

After "and the" insert -- first --.

Signed and Sealed this

Second Day of January, 2007

JON W. DUDAS
*Director of the United States Patent and Trademark Office*